United States Patent
Chen et al.

(10) Patent No.: US 11,995,471 B2
(45) Date of Patent: May 28, 2024

(54) RESOURCE INTEGRATION SYSTEM AND RESOURCE INTEGRATION METHOD

(71) Applicant: Acer Incorporated, New Taipei (TW)

(72) Inventors: Kuan-Ju Chen, New Taipei (TW);
Wen-Cheng Hsu, New Taipei (TW);
Hung-Ming Chang, New Taipei (TW);
Chih-Wen Huang, New Taipei (TW);
Chao-Kuang Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 423 days.

(21) Appl. No.: 17/324,349

(22) Filed: May 19, 2021

(65) Prior Publication Data

US 2022/0050721 A1  Feb. 17, 2022

(30) Foreign Application Priority Data

Aug. 17, 2020  (TW) .................................. 109127894

(51) Int. Cl.
*G06F 9/50* (2006.01)
*G06F 9/455* (2018.01)

(52) U.S. Cl.
CPC ........ *G06F 9/5016* (2013.01); *G06F 9/45545* (2013.01); *G06F 9/45558* (2013.01);
(Continued)

(58) Field of Classification Search
CPC ............... G06F 9/5016; G06F 9/45545; G06F 9/45558; G06F 9/5077; G06F 2209/509; G06F 9/5044
See application file for complete search history.

(56) References Cited

U.S. PATENT DOCUMENTS 9,167,055 B2  10/2015  Lai et al.
9,311,169 B2   4/2016  Diard
(Continued)

FOREIGN PATENT DOCUMENTS

TW  201407536 A  2/2014
TW  201426325 A  7/2014
(Continued)

OTHER PUBLICATIONS

Chinese language office action dated Jul. 14, 2021, issued in application No. TW 109127894.

*Primary Examiner* — Dong U Kim
(74) *Attorney, Agent, or Firm* — McClure, Qualey & Rodack, LLP (57) ABSTRACT

A resource integration method includes the following steps: a receiving module receives access information from a guest operating system on the host device; the access information is used to determine whether the frame rate is lower than a frame rate threshold; when the receiving module determines that the frame rate is lower than the frame rate threshold, the receiving module transmits an external resource request signal to the receiving module; after the receiving module receives the external resource request signal, a resource management module (which is located in the bridge module) selects an optimal external device from a specific category (among a plurality of categories in a candidate list), and a calculation operation or a storage operation corresponding to the specific category is transmitted to the optimal external device for calculation or storage by the bridge module.

16 Claims, 5 Drawing Sheets

(52) U.S. Cl.
CPC .. *G06F 9/5077* (2013.01); *G06F 2009/45587* (2013.01); *G06F 2209/508* (2013.01)

(56) References Cited

U.S. PATENT DOCUMENTS

| | | |
|---|---|---|
| 9,996,892 B2 | 6/2018 | Yin et al. |
| 10,217,444 B2 | 2/2019 | Diard et al. |
| 10,853,118 B2 | 12/2020 | Tian et al. |
| 2013/0332456 A1* | 12/2013 | Arkin .................... G06F 16/285 707/737 |
| 2014/0055470 A1* | 2/2014 | Diard ..................... G06F 13/10 345/520 |
| 2014/0196034 A1* | 7/2014 | Amano ............... G06F 9/45537 718/1 |
| 2014/0281008 A1* | 9/2014 | Muthiah ................. H04L 67/01 709/231 |
| 2014/0330888 A1* | 11/2014 | Dave ................... H04L 43/0882 709/203 |
| 2015/0205630 A1* | 7/2015 | Hu ...................... G06F 9/45558 718/1 |
| 2016/0044139 A1 | 2/2016 | Lin et al. |
| 2017/0371614 A1* | 12/2017 | Miyamoto ............ G06F 3/1462 |
| 2019/0034161 A1* | 1/2019 | Jo ....................... G06F 3/04842 |
| 2020/0201733 A1* | 6/2020 | Lee ........................ G06F 11/327 |
| 2020/0249936 A1* | 8/2020 | Barfield, Jr. .............. G06F 8/60 |

FOREIGN PATENT DOCUMENTS

| | | |
|---|---|---|
| TW | 201506843 A | 2/2015 |
| TW | 201624278 A | 7/2016 |
| TW | 201706834 A | 2/2017 |
| TW | 201727576 A | 8/2017 |
| WO | 2020/101142 A1 | 5/2020 |
| WO | 2020/149722 A1 | 7/2020 |

* cited by examiner

RESOURCE INTEGRATION SYSTEM AND RESOURCE INTEGRATION METHOD

CROSS REFERENCE TO RELATED APPLICATIONS

This Application claims priority of Taiwan Patent Application No. 109127894, filed on Aug. 17, 2020, the entirety of which is incorporated by reference herein.

BACKGROUND OF THE INVENTION

Field of the Invention

The present disclosure relates to an integration system and, in particular, to a resource integration system and resource integration method suitable for a virtual environment.

Description of the Related Art

Most electronic sports (e-sports) game competitions run on the Windows operating system. At present, large e-sports companies (such as Valve Corporation) have purchased the Windows operating system versions of 6,500 games for execution on Linux platforms.

It can be seen that playing the Windows operating system version of games on platforms that run Linux has gradually become a trend, and will likely remain a trend well into the future. The Windows operating system version of a game or program must be run on a Chromebook or Linux operating system platform. If it is executed with a simulated tool program, all application programming interfaces (API) and runtimes are set together, and it directly accesses the operating system of the Linux platform during execution. This method is not very stable, and it can cause the program to crash easily. Therefore, the industry mostly adds a virtual machine to protect it.

However, there are still differences in performance between running e-sports games on virtual machines and running e-sports games directly on a Windows operating system. Therefore, how to balance stability and game experience has become one of the problems that need to be solved in this field.

BRIEF SUMMARY OF THE INVENTION

In accordance with one feature of the present invention, the present disclosure provides a resource integration system suitable for a virtual environment. The resource integration system comprises a receiving module and a bridge module. The receiving module is configured to receive access information from a guest operating system on the host device, and determine whether the frame rate is lower than a frame rate threshold according to the access information; when the receiving module determines that the frame rate is lower than the frame rate threshold, the receiving module transmits an external resource request signal. After the external resource request signal is received, a resource management module (which is located in the bridge module) selects an optimal external device from a specific category (among a plurality of categories in a candidate list), and the resource management module transmits a calculation operation or a storage operation corresponding to the specific category to the optimal external device for calculation or storage.

In accordance with one feature of the present invention, the present disclosure provides a resource integration method suitable for a virtual environment. The resource integration method includes the following steps: the receiving module receives access information from a guest operating system on the host device; the receiving module determines whether the frame rate is lower than the frame rate threshold according to the access information; when the frame rate is lower than the frame rate threshold, the receiving module transmits an external resource request signal to the receiving module; after the receiving module receives the external resource request signal, the resource management module (which is located in the bridge module) selects an optimal external device from a specific category (among a plurality of categories in a candidate list), and a calculation operation or a storage operation corresponding to the specific category is transmitted to the optimal external device for calculation or storage by a bridge module.

Therefore, during rendering, or during other operations that use the resource integration system and resource integration method, the bridge module and the receiving module allow the original system to integrate system resources after connecting with external devices. The guest operating system in the virtual environment determines whether or not there are sufficient hardware resources, and it detects which types of hardware resource are insufficient. Based on the insufficient hardware types, the bridge module selects the best hardware type from the external device, and a computing operation or a storage operation is handed over to the best hardware type, so that performance and user experience of running applications on the guest operating system can be improved.

BRIEF DESCRIPTION OF THE DRAWINGS

In order to describe the manner in which the above-recited and other advantages and features of the disclosure can be obtained, a more particular description of the principles briefly described above will be rendered by reference to specific examples which are illustrated in the appended drawings. It should be understood that these drawings depict only exemplary aspects of the disclosure and are not therefore to be considered to be limiting of its scope. The principles herein are described and explained with additional specificity and detail through the use of the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
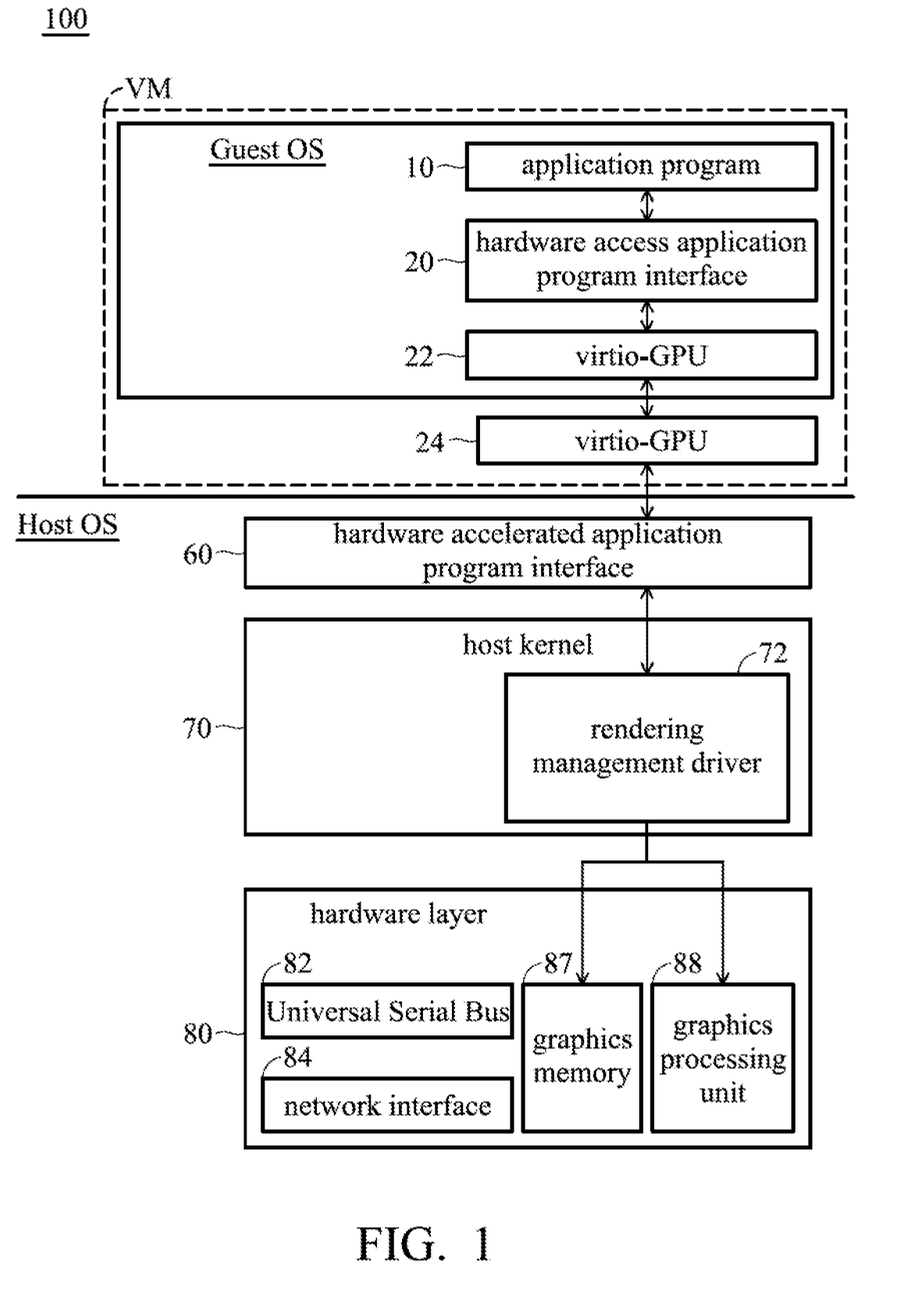
FIG. 1 is a block diagram of a resource integration system in accordance with one embodiment of the present disclosure.

Refer to FIG. 1, FIG. 1 is a block diagram of a resource integration system 100 in accordance with one embodiment of the present disclosure. As shown in FIG. 1, the resource integration system 100 constructs a virtual machine VM on the host OS of the host device. A guest operating system Guest OS runs on the virtual machine VM. Application program 10 is executed on a virtual machine VM environment. Both the virtual machine VM and the guest operating system Guest OS have virtio-GPU 22 and 24. The virtio method is a known technology, used to make certain modifications to the guest operating system Guest OS (for example, installing the corresponding driver), which can greatly improve the input/output performance of the virtual machine.

When rendering is required, the application program 10 sends a request (rendering-related execution instructions) to the hardware access application program interface (API) 20. The hardware access application program interface 20 sends the request to the virtio-GPU 22. The virtio-GPU 22 then transmits the request to the virtio-GPU 24. The virtio-GPU 24 will pass the request to hardware acceleration application program interface (Hardware Acceleration API) 60 of the host. The hardware accelerated application program interface 60 transmits the request to the rendering management driver 72 of the host kernel 70. The rendering management driver 72 transmits the request to the graphics processing unit 88 and the graphics memory 87 in the hardware layer 80. The graphics processing unit 88 mainly performs rendering work and sends the rendering result back to the guest operating system Guest OS according to the path of the transmission request. The guest operating system Guest OS presents the image on the display.

The hardware acceleration application programming interface 60 is an acceleration API (it is known that OpenGL and Vulkan can be used to implement the acceleration API).

It can be seen from the above that the information transmission between the hardware access and the image presentation is covered by the virtual machine VM, and the upper- and lower-layer instructions need to be converted again. The architecture in FIG. 1 is highly secure, but its performance is limited. The architecture in FIG. 1 is difficult to achieve bridging the gap without sacrificing the original security.

Figure 2:
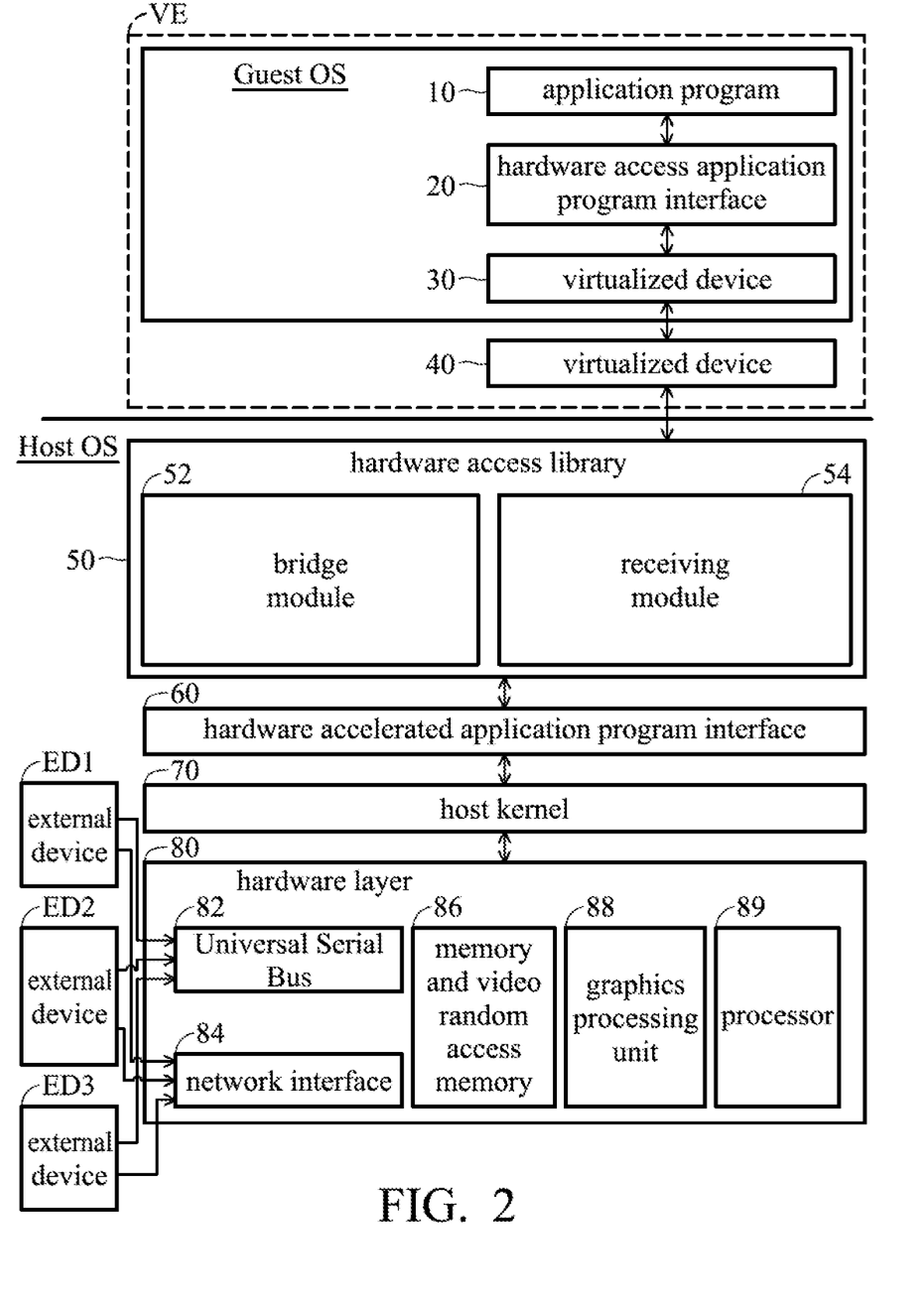
FIG. 2 is a block diagram of a resource integration system 200 in accordance with one embodiment of the present disclosure.
Figure 3:
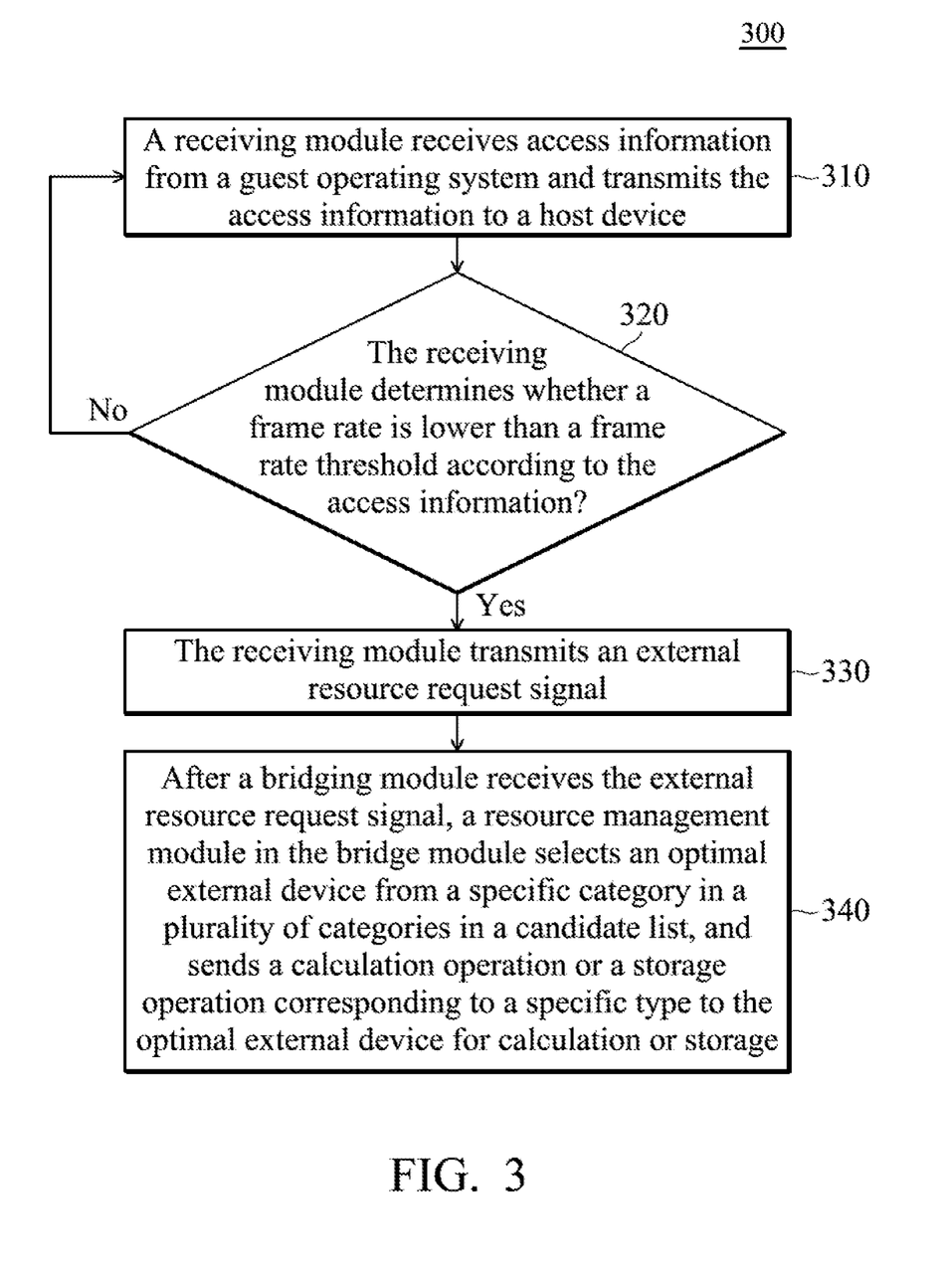
FIG. 3 is a flowchart of a resource integration method in accordance with one embodiment of the present disclosure.
Figure 4:
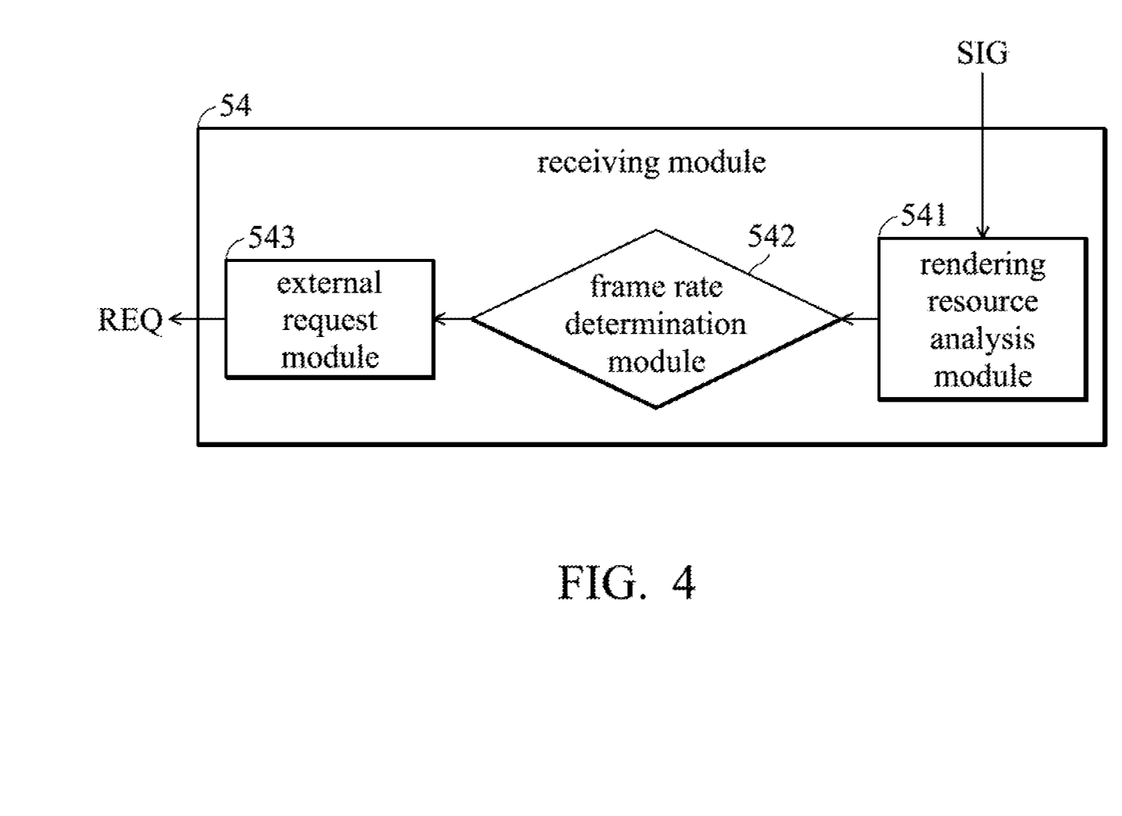
FIG. 4 is a schematic diagram of a receiving module in accordance with one embodiment of the present disclosure.

Therefore, the present invention proposes the resource integration system 200, the resource integration method 300, and the resource integration system 400 shown in FIGS. 2 to 4, which can obtain external physical devices and virtualized devices through the host device, perform resource integration, and then implement the result to the guest operating system Guest OS in the virtualized environment. This makes the guest operating system Guest OS to achieve increasing performance and available resources when running application program 10.

Please refer to FIG. 2, FIG. 2 is a block diagram of a resource integration system 200 in accordance with one embodiment of the present disclosure. In one embodiment, the resource integration system 200 includes a bridge module 52 and a receiving module 54. The bridge module 52 and the receiving module 54 are located in a hardware access library 50 of the host device.

In one embodiment, the bridge module 52 can be implemented by using an integrated circuit, such as a microcontroller, a microprocessor, a digital signal processor, an application specific integrated circuit (ASIC), or a logic circuit. However, it is not limited thereto. In one embodiment, the bridge module 52 can be implemented by software or firmware.

In one embodiment, the receiving module 54 can be implemented by using an integrated circuit, such as a microcontroller, a microprocessor, a digital signal processor, an application specific integrated circuit, or a logic circuit. However, it is not limited thereto. In one embodiment, the receiving module 54 can be implemented by software or firmware.

In one embodiment, the bridge module 52 is used to enable a host operating system Host OS of a host device to communicate with an external device (for example, external devices ED1-ED3) and obtain external device information.

In one embodiment, when the external devices ED1-ED3 are communicatively coupled with the Universal Serial Bus (USB) 82 and/or the network interface 84 of the host device, the host kernel 70 transmits the external device information of the external devices ED1-ED3 to the bridge module 52. For example, when the external device ED1 is communicatively coupled with the Universal Serial Bus 82 and/or the network interface 84, the host kernel 70 transmits the external device information of the external devices ED1-ED3 through the path of the hardware layer 80, the host kernel 70, and the hardware accelerated application program interface 60 to the bridge module 52.

In one embodiment, the external devices ED1 and ED2 are electronic devices such as mobile phones, tablets, laptops, servers, etc.

In one embodiment, the external device information is, for example, the memory size of the external devices ED1, ED2, the size of the storage device, processor-related information, whether there is an operating system, whether there is a virtual environment or virtual device . . . and other software and/or hardware information.

In one embodiment, the receiving module 54 is used to receive an access command from a guest operating system Guest OS to the host device, receive a hardware processing result from the host device, and selectively transmit the access command through the bridge module 52 to the external devices ED1, ED2 and receive the hardware processing results from the external devices ED1, ED2. The hardware processing result corresponds to the access command.

In one embodiment, the host device executes a virtual environment VE (for example, implemented by a virtual machine) on the operating system Host OS of the host device. The guest operating system Guest OS executes in the virtual environment VE. And, the guest operating system Guest OS executes an application program 10. The application program 10 is used to issue access commands.

For example, when the application program 10 wants to perform rendering, it transmits the rendering command (treated as an access command) and related information to the hardware access application program interface 20. The hardware access application program interface 20 transmits the rendering command and related information to the virtualized device 30. The virtualized device 30 transmits the rendering command and related information to the virtualized device 40. The virtualized device 40 sends rendering commands and related information to the hardware access library 50. The hardware access library 50 transmits rendering commands and related information to the hardware acceleration application program interface 60. The hardware accelerated application program interface 60 sends the rendering commands and related information to the host kernel 70. The host kernel 70 transmits the rendering commands and related information to the graphics processing unit 88, the memory and video random access memory 86 and the processor 89. The graphics processing unit 88 is mainly used for rendering. The graphics memory 87 can temporarily store information related to rendering. The processor 89 can selectively assist in the calculation. The graphics processing unit 88 returns the rendering result to the guest operating system Guest OS according to the path of the transmission request, and the guest operating system Guest OS presents the image to the user.

The bridge module 52 and receiving module 54 are in a hardware access library 50 of the host device. The hardware access library 50 is between a virtualization device 40 in the virtual environment VE and a hardware acceleration application program interface 60 of the host device. The internal operation of hardware access library 50 will be described in the explanatory paragraphs corresponding to FIGS. 3-5.

Figure 5:
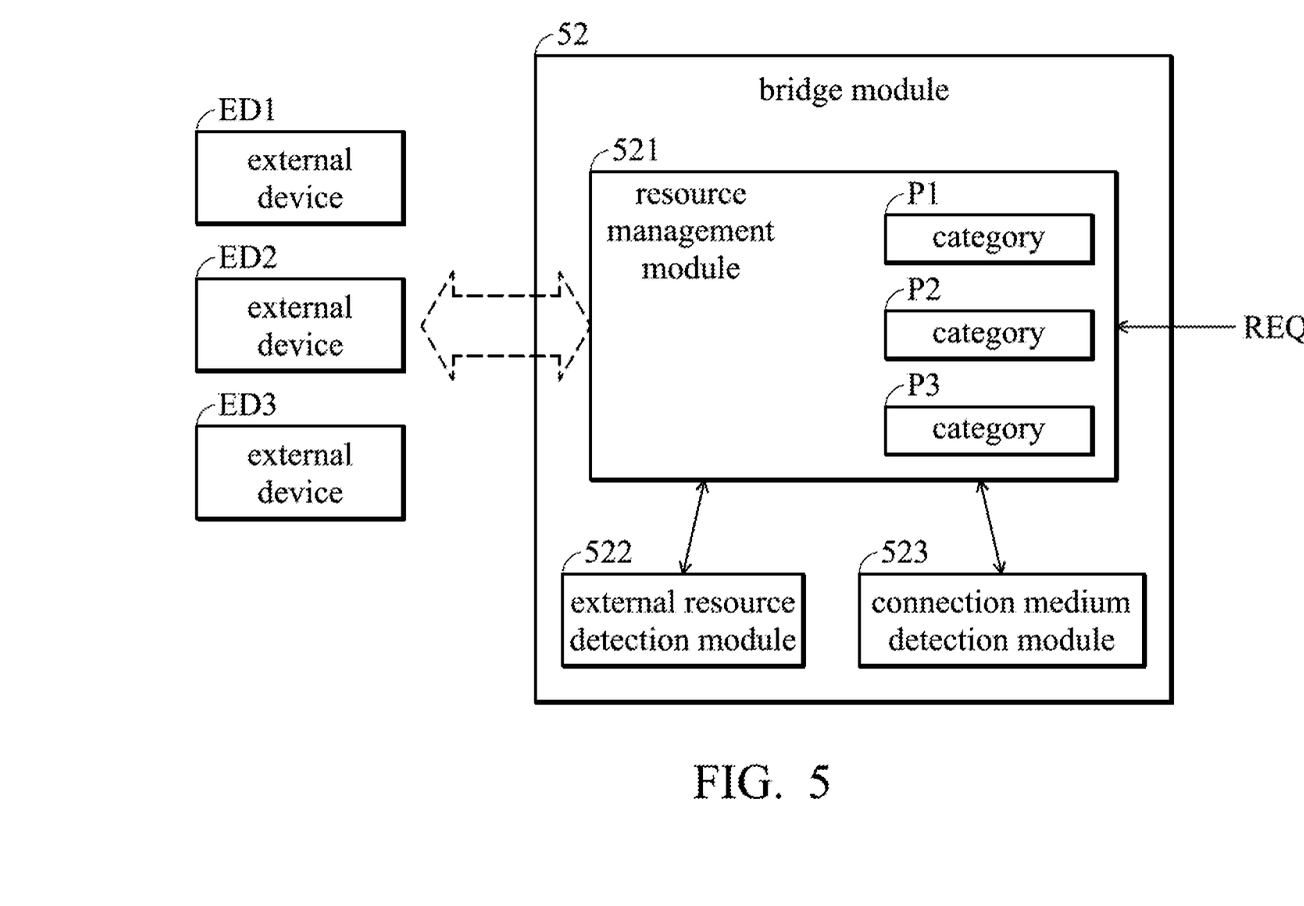
FIG. 5 is a schematic diagram of a bridge module in accordance with one embodiment of the present disclosure.

Please refer to FIGS. 3 and 5, FIG. 3 is a flowchart of a resource integration method 300 in accordance with one embodiment of the present disclosure. FIG. 4 is a schematic diagram of a receiving module 54 in accordance with one embodiment of the present disclosure. FIG. 5 is a schematic diagram of a bridge module 52 in accordance with one embodiment of the present disclosure.

In step 310, a receiving module 54 receives access information SIG from a guest operating system Guest OS and transmits the access information SIG to a host device.

In an embodiment, the access information SIG may be a numeric value or machine code output from an intermediary layer (for example, the virtualized device 40).

In one embodiment, the access information SIG includes frame rate (frame per second, FPS). The frame rate can reflect the number of pictures presented per second. When the application program 10 is a three-dimensional game, an e-sports game or a application requiring detailed and fast presentation of the image, the sufficient hardware resources (such as processor, graphics processor, memory, etc.) are required to generate the application program 10 required frame rate to provide users with a good user experience.

In step 320, the receiving module 54 determines whether a frame rate is lower than a frame rate threshold according to the access information SIG.

When the receiving module 54 determines that the frame rate is lower than the frame rate threshold according to the access information SIG, step 330 is performed. For example, when the frame rate (for example, 30 fps) is lower than the frame rate threshold (for example, 80 fps), step 330 is performed.

When the receiving module 54 determines that the frame rate is not lower than the frame rate threshold according to the access information SIG, it returns to step 310 to continuously detect the frame rate, or ends the process.

In step 330, the receiving module 54 transmits an external resource request signal REQ.

In one embodiment, as shown in FIG. 4, when the rendering resource analysis module 541 of the receiving module 54 receives the access information SIG, the frame rate determining module 542 determines that the frame rate is lower than the frame rate threshold, it represents insufficient hardware resources of the host device. Therefore, the receiving module 54 transmits the external resource request signal REQ to the bridge module 52 through the external request module 543.

In one embodiment, the rendering resource analysis module 541, the frame rate determination module 542, and the external request module 543 can be implemented as, for example, a micro-control unit, a microprocessor, a digital signal processor, and a special application integrated circuit, or a logic circuit. In one embodiment, the rendering resource analysis module 541, the frame rate determination module 542, and the external request module 543 can be implemented by software or firmware separately or together.

In step 340, after a bridge module 52 receives the external resource request signal REQ, a resource management module 521 in the bridge module 52 selects an optimal external device (for example, the external device ED1) from a specific category (for example, category P1) in a plurality of categories P1 to P3 in a candidate list, and sends a calculation operation or a storage operation corresponding to a specific type to the optimal external device for calculation or storage.

In FIG. 5, the bridge module 52 further includes an external resource detection module 522, a connection medium detection module 523, and a resource management module 521. In one embodiment, the external resource detection module 522, the connection medium detection module 523, and the resource management module 521 can be implemented as, for example, a micro-control unit, a microprocessor, a digital signal processor, and a special application integrated circuit, or a logic circuit. In one embodiment, the external resource detection module 522, the connection medium detection module 523, and the resource management module 521 can be implemented by software or firmware separately or together.

In one embodiment, the external resource detection module 522 is used to detect hardware information of the external device when the external device (e.g., external devices ED1 to ED3) is coupled to the host device, and to detect whether the external device contains an operating system. When the external device contains an operating system, the external resource detection module 522 enumerates the external device into the candidate list according to the hardware information. When the external device does not contain an operating system, this external device is not used.

The hardware information includes the hardware performance or hardware specifications of at least one external device. For example, the external device ED1 has two 8 GB memories and an Intel® Core™ i7 processor. For example, the external device ED2 has two 4 GB memories and an Intel® Core™ i5 processor. The candidate list can include hardware information corresponding to each external device.

In one embodiment, the external resource detection module 522 will check whether the external device connected to the host device has an operating system, hardware acceleration application interface, and the perform the resource detection such as detecting the hardware performance of the external device (such as processor performance), hardware specifications (such as graphic processor specifications), memory size, etc.

In one embodiment, the connection medium detection module 523 identifies a connection medium used by the external device when an external device is coupled to the host device. In one embodiment, the connection medium detection module 523 identifies the connection medium of the connected external device (such as universal serial bus (USB) 2.0, USB 3.0, local area network (LAN)), wireless local area networks (WLAN), etc.

In one embodiment, the resource management module 521 creates these categories according to hardware information returned by the external resource detection module 522 and a connection medium returned by a connection medium detection module 523. These categories include a bandwidth category P1, a memory category P2, and a graphics bandwidth category P3. In other words, when the resource management module 521 detects that an external device is connected to the host device, it creates these categories. However, the present invention is not limited to these categories, and the resource management module 521 can create categories according to various hardware in the external device.

In one embodiment, the bandwidth category records external devices having processor (for example, external devices ED1, ED2, ED3), and processor-related information, such as the number of processors, performance, specifications . . . , and other information and the bandwidth of the external device.

In one embodiment, the memory category records external devices having memory (for example, external devices ED1, ED2, ED3), and memory-related information, such as the number of memories, size, specification, etc.

In one embodiment, the graphics bandwidth category records external devices having graphics processor (for example, external devices ED1 and ED2), and graphics processor-related information, such as the number of graphics processors, size, specification, etc.

In one embodiment, when the bridge module 52 receives the external resource request signal REQ, the resource management module 521 in the bridge module 52 determines whether the host device (for example, the processor 89 in FIG. 2) is busy. If the resource management module 521 determines that the host device is busy, if the USB or serial port is called again, the number of interrupt requests (IRQ) of the processor 89 may be increased. Therefore, the resource management module 521 selects the external device that uses the network as the medium and has the largest bandwidth as the priority. The specific category is regarded as the bandwidth category P1, and the optimal external processors with the best bandwidth is selected from bandwidth category P1 in the candidate list. For example, the bandwidth (5G) of the external device ED1 is higher than the bandwidth (4G) of the external device ED2, and the bandwidth of the external device ED2 is higher than the bandwidth (3G) of the external device ED3, the models of these processors are recorded in the bandwidth category P1 in the candidate list. The resource management module 521 selects the processor corresponding to the external device ED1 with the best bandwidth from the bandwidth category P1 in the candidate list as an optimal external device, and transmits the calculation operation corresponding to the bandwidth category P1 to the optimal external processor (the processor of the external device ED1) for calculation. The optimal external processor is an external processor corresponding to the best bandwidth in the bandwidth category P1.

In one embodiment, when the frame rate is lower than the frame rate threshold and the resource management module 521 determines whether the host device is busy, the resource management module 521 will perform a packet test, send the packet to each external device ED1-ED3, and select the one with the fastest bandwidth network transmission speed from the external devices ED1-ED3 is regarded as the optimal external processor, and the calculation operation corresponding to the bandwidth category P1 is transmitted to the optimal external processor (the processor of the external device ED1) for calculation.

In one embodiment, when the optimal external processor (for example, the processor of the external device ED1) performs calculations, the resource management module 521 determines that the host system is still busy, which means that the processor of the main system plus the processor of the external device ED1 is still insufficient in terms of calculation speed, the resource management module 521 selects another external processor (such as the processor of the external device ED2) corresponding to the second best bandwidth from the bandwidth category P1 in the candidate list to prompt the other external processor to assist in performing the calculation operation.

In one embodiment, the processor of the external device ED1 is, for example, Intel® Core™ i7, which uses 5G bandwidth. The processor of the external device ED2 is, for example, Intel® Core™ i5, using 4G bandwidth. The processor of the external device ED3 is, for example, Intel® Core™ i3, using 3G bandwidth. The models of these processors are recorded in the bandwidth category P1 in the candidate list. The resource management module 521 selects the processor of the external device ED1 with the best performance (which may be the fastest computing speed or the fastest transmission speed) from the bandwidth category P1 in the candidate list as an optimal external processor.

In one embodiment, if the resource management module 521 determines that the host device is not busy, it determines whether other devices have insufficient resources. For example, the resource management module 521 determines whether the memory space resources are insufficient and/or the graphics processor computing resources are insufficient.

In one embodiment, the external device ED1 has two 8 GB memories. The external device ED2 has two 4 GB memories. The external device ED3 has a 4 GB memory. The memory of the external device ED1 is the largest of the external devices ED1, ED2, and ED3. The models of these memories are recorded in the memory category P2 in the candidate list. If the resource management module 521 determines that the host device is not busy, the resource management module 521 determines whether the memory usage rate is higher than a memory usage threshold. If the resource management module 521 determines that the memory usage rate is higher than the memory usage threshold, and the specific category is regarded as the memory category P2, the resource management module 521 selects an optimal external memory from the memory category P2 in the candidate list (because the memory capacity of the external device ED1 is larger, the memory of the external device ED1 is selected), and the storage operation corresponding to the memory type P2 is transferred to the optimal external memory for storage. The optimal external memory is an external memory with the most storage space in the memory category P2.

In one embodiment, when the storage space of the host device (such as the memory and video random access memory 86 in FIG. 2) plus the optimal external memory (such as the memory of the external device ED1) is insufficient, the resource management module 521 selects another external processor (such as the memory of the external device ED2) with sub-optimal processing performance from the memory category P2 in the candidate list, and prompts the other memory to assist in the storage operation.

In one embodiment, both the external device ED1 and the external device ED2 have graphics processors. The performance of the graphics processor of the external device ED1 is better. In one embodiment, if the resource management module 521 determines that the host device is not busy, the resource management module 521 determines whether the graphics processor usage rate is higher than the graphics processor usage threshold. If the resource management module 521 determines that the graphics processor usage rate is higher than the graphics processor usage threshold, and the specific category is regarded as the graphics bandwidth category P3, the resource management module 521 selects an optimal external graphics processor from bandwidth category P3 in the candidate list (for example, the graphics processor of the external device ED1), and transmits the calculation operation corresponding to the graphics bandwidth category P3 to the optimal external graphics processor for calculation. The optimal external graphics processor is an external graphics processor with the best computing performance in the graphics bandwidth category P3.

In one embodiment, when the computing performance of the host device (such as the graphics processing unit 88 in FIG. 2) plus the optimal external graphics processor (such as the graphics processor of the external device ED1) is still insufficient, the resource management module 521 selects another external graphics processor (such as the graphics processor of the external device ED2) with sub-optimal processing performance from the graphics bandwidth category P3 of the candidate list, and prompts the other graphics processor to assist in the calculation operation.

Therefore, in the mechanism of rendering or other operations using the resource integration system and resource integration method, the mechanism of the bridge module and the receiving module allow the original system to integrate the system resources after connecting with external devices. The guest operating system in the virtual environment determines whether there is insufficient hardware resource at present, and detects those types of hardware resource that are insufficient. According to the insufficient hardware type, the bridge module selects the best one of this hardware type from the external device, the computing operation or storage operation is handed over to the best one of this hardware type, so that the performance and user experience of running applications on the guest operating system can be improved.

The method of the present invention, or a specific type or part thereof, can exist in the form of code. The code can be contained in physical media, such as floppy disks, CDs, hard disks, or any other machine-readable (such as computer-readable) storage media, or not limited to external forms of computer program products. When the program code is loaded and executed by a machine, such as a computer, the machine becomes a device for the present application. The code can also be transmitted through some transmission medium, such as a wire or cable, optical fiber, or any transmission type. When the code is received, loaded and executed by a machine, such as a computer, the machine becomes used to apply in the present application. When implemented in a general-purpose processing unit, the program code combined with the processing unit provides a unique device that operates similar to the application of specific logic circuits.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A resource integration system suitable for a virtual environment, the resource integration system comprising:
    a receiving module, configured to receive access information from a guest operating system and transmits the access information to a host device, and determine whether a frame rate is lower than a frame rate threshold according to the access information;
    when the receiving module determines that the frame rate is lower than the frame rate threshold, the receiving module transmits an external resource request signal; and
    a bridge module, wherein after receiving the external resource request signal, a resource management module in the bridge module selects a specific external device from a specific category among a plurality of categories in a candidate list based on a result of a packet test transmitted using the candidate list, and transmits a calculation operation or a storage operation corresponding to the specific category to the specific external device for calculation or storage.

2. The resource integration system of claim 1, wherein the bridge module further comprises:
    an external resource detection module, configured to detect hardware information of an external device when the external device is coupled to the host device, and to detect whether the external device comprises an operating system; wherein when the external device comprises an operating system, the external resource detection module enumerates the external device in the candidate list according to the hardware information; wherein the hardware information comprises hardware performance or hardware specifications.

3. The resource integration system of claim 2, wherein the resource management module creates the plurality of categories according to the hardware information returned by the external resource detection module and a connection medium returned by a connection medium detection module, and the plurality of categories comprise a bandwidth category, a memory category, and a graphics bandwidth type.

4. The resource integration system of claim 3, wherein when the bridge module receives the external resource request signal, the resource management module in the bridge module determines whether the host device is busy; if the resource management module determines that the host device is busy and the specific category is regarded as the bandwidth category, the resource management module selects a specific external processor from the bandwidth category in the candidate list, and transmits the calculation operation corresponding to the bandwidth category to the specific external processor for calculation; wherein the specific external processor is an external processor corresponding to the highest bandwidth in the bandwidth category.

5. The resource integration system of claim 4, wherein when the specific external processor performs calculations, and the resource management module determines that the host device is still busy, the resource management module selects next external processor with a lower bandwidth from the bandwidth category in the candidate list, and the resource management module prompts the next external processor to assist in the calculation operation.

6. The resource integration system of claim 3, wherein if the resource management module determines that the host device is not busy, the resource management module determines whether a host memory usage rate is higher than a host memory usage threshold; if the resource management module determines that the host memory usage rate is higher than the host memory usage threshold, the specific category is regarded as the memory category, and the resource management module selects a specific external memory from the memory category in the candidate list, and transmits the storage operation corresponding to the memory category to the specific external memory for storage; wherein the specific external memory is an external memory with the largest amount of storage space in the memory category.

7. The resource integration system of claim 3, wherein if the resource management module determines that the host device is not busy, the resource management module determines whether a host graphics processor usage rate is higher than a host graphics processor usage threshold; if the resource management module determines that the host graphics processor usage rate is higher than the host graphics processor usage threshold, the specific category is regarded as the graphics bandwidth category, and the resource management module selects a specific external graphics processor from the graphics bandwidth category in the candidate list, and transmits the calculation operation corresponding to the graphics bandwidth category to the specific external graphics processor for calculation; wherein the specific external graphics processor is an external graphics processor with the highest computing performance in the graphics bandwidth category.

8. The resource integration system of claim 1, wherein the bridge module further comprises:
a connection medium detection module, configured to identify a connection medium used by the external device when the external device is coupled to the host device.

9. A resource integration method suitable for a virtual environment, the resource integration method comprising:
receiving access information from a guest operating system and transmitting the access information to a host device by a receiving module;
determining whether the frame rate is lower than the frame rate threshold according to the access information;
when the receiving module determines that the frame rate is lower than the frame rate threshold, the receiving module transmits an external resource request signal to the receiving module; and
after the external resource request signal is received, a resource management module in the bridge module selects a specific external device from a specific category among a plurality of categories in a candidate list based on a result of a packet test transmitted using the candidate list, and transmits a calculation operation or storage operation corresponding to the specific category to the specific external device for calculation or storage by a bridge module.

10. The resource integration method of claim 9, wherein the bridge module further comprises:
detecting hardware information of an external device when the external device is coupled to the host device, and using an external resource detection module to detect whether the external device comprises an operating system, wherein when the external device comprises an operating system, the external resource detection module enumerates the external device in the candidate list according to the hardware information; wherein the hardware information comprises hardware performance or hardware specifications.

11. The resource integration method of claim 10, further comprising:
the resource management module creates the plurality of categories according to the hardware information returned by the external resource detection module and the connection medium returned by the connection medium detection module, wherein the plurality of categories comprise a bandwidth category, a memory category, and a graphics bandwidth type.

12. The resource integration method of claim 11, wherein when the bridge module receives the external resource request signal, the resource management module in the bridge module determines whether the host device is busy; if the resource management module determines that the host device is busy and the specific category is regarded as the bandwidth category, the resource management module selects a specific external processor from the bandwidth category in the candidate list, and transmits the calculation operation corresponding to the bandwidth category to the specific external processor for calculation; wherein the specific external processor is an external processor corresponding to the highest bandwidth in the bandwidth category.

13. The resource integration method of claim 12, wherein when the specific external processor performs calculations, the resource management module determines that the host device is still busy, and the resource management module selects next external processor with a lower bandwidth from the bandwidth category in the candidate list, the resource management module prompts the next external processor to assist in the calculation operation.

14. The resource integration method of claim 11, wherein if the resource management module determines that the host device is not busy, the resource management module determines whether a host memory usage rate is higher than the host memory usage threshold; if the resource management module determines that the host memory usage rate is higher than the host memory usage threshold, the specific category is regarded as the memory category, and the resource management module selects a specific external memory from the memory category in the candidate list, and transmits the storage operation corresponding to the memory category to the specific external memory for storage; wherein the specific external memory is an external memory with the largest amount of storage space in the memory category.

15. The resource integration method of claim 11, wherein if the resource management module determines that the host device is not busy, the resource management module determines whether a host graphics processor usage rate is higher than the host graphics processor usage threshold; if the resource management module determines that the host graphics processor usage rate is higher than the host graphics processor usage threshold, the specific category is regarded as the graphics bandwidth category, and the resource management module selects a specific external graphics processor from the graphics bandwidth category in the candidate list, and transmits the calculation operation corresponding to the graphics bandwidth category to the specific external graphics processor for calculation; wherein the specific external graphics processor is an external graphics processor with the highest computing performance in the graphics bandwidth category.

16. The resource integration method of claim 9, wherein the bridge module further comprises:
   using an external resource detection module to identify a connection medium used by the external device when the external device is coupled to the host device.

* * * * *